(12) United States Patent
Gresset et al.

(10) Patent No.: US 10,939,619 B2
(45) Date of Patent: Mar. 9, 2021

(54) ENVELOPING DEVICE FOR ENVELOPING A BALE WITH AN ENVELOPING MATERIAL, A BALER, AND METHOD THEREOF

(71) Applicant: DEERE & COMPANY, Moline, IL (US)

(72) Inventors: Pascal Gresset, Auxon Dessous (FR); Didier Delphigue, Dijon (FR); Frederic Perrotin, Le Tremblois (FR)

(73) Assignee: DEERE & COMPANY, Moline, IL (US)

( * ) Notice: Subject to any disclaimer, the term of this patent is extended or adjusted under 35 U.S.C. 154(b) by 235 days.

(21) Appl. No.: 16/011,724

(22) Filed: Jun. 19, 2018

(65) Prior Publication Data

US 2018/0368329 A1    Dec. 27, 2018

(30) Foreign Application Priority Data

Jun. 27, 2017 (DE) ...................... 10 2017 210 849.5

(51) Int. Cl.
*A01F 15/06* (2006.01)
*A01F 15/07* (2006.01)
*B65B 11/00* (2006.01)

(52) U.S. Cl.
CPC .... *A01F 15/0715* (2013.01); *A01F 2015/072* (2013.01); *A01F 2015/076* (2013.01); *A01F 2015/0745* (2013.01)

(58) Field of Classification Search
CPC ........ A01F 2015/072; A01F 2015/0745; A01F 2015/076; B65B 11/06
USPC ............... 53/203, 389.1, 389.2, 389.4; 493/8
See application file for complete search history.

(56) References Cited

U.S. PATENT DOCUMENTS 5,282,346 A * 2/1994 Masuda ............... B65B 69/0033
53/118
6,164,047 A * 12/2000 Rossi .................... B65B 11/045
53/556
6,185,900 B1 * 2/2001 Martin .................. B65B 11/045
53/118

(Continued)

FOREIGN PATENT DOCUMENTS

CA          1313465 C       2/1993
DE        10026066 A1      11/2001

(Continued)

OTHER PUBLICATIONS

German Search Report issued in counterpart application No. 102017210849.5 dated Feb. 20, 2018. (10 pages).

(Continued)

*Primary Examiner* — Gloria R Weeks

(57) ABSTRACT

An enveloping device for enveloping a bale with an enveloping material for a baler includes a supply of the enveloping material. The supply is configured to feed the enveloping material to a pressing chamber of the baler through a feed gap. A braking device is provided for the enveloping material. The braking device is configured such that it has an effect that the enveloping material assumes an at least substantially predetermined position with respect to the pressing chamber of the baler to at least one working means of the baler or to the bale at either an end or a start of an enveloping operation.

13 Claims, 4 Drawing Sheets

(56) References Cited

U.S. PATENT DOCUMENTS

| | | | | |
|---|---|---|---|---|
| 6,269,610 | B1* | 8/2001 | Lancaster, III | B65B 11/045 53/399 |
| 7,694,491 | B2* | 4/2010 | Noonan | A01F 15/071 100/4 |
| 7,908,831 | B1* | 3/2011 | Dugan | B65B 11/006 53/211 |
| 8,601,770 | B2* | 12/2013 | Paillet | A01F 15/0715 53/211 |
| 2004/0121108 | A1* | 6/2004 | Mass | A01F 15/071 428/57 |
| 2004/0182050 | A1* | 9/2004 | Pieri | B65B 11/045 53/556 |
| 2004/0221547 | A1* | 11/2004 | Anstey | A01F 15/0715 53/399 |
| 2007/0240389 | A1* | 10/2007 | Frerichs | A01F 15/0715 53/587 |
| 2009/0282788 | A1* | 11/2009 | McClure | A01F 15/0715 53/587 |
| 2010/0037562 | A1* | 2/2010 | Forni | B65B 51/00 53/461 |
| 2010/0192516 | A1* | 8/2010 | Olander | A01F 15/0715 53/399 |
| 2010/0236190 | A1* | 9/2010 | Paillet | A01F 15/0715 53/203 |
| 2012/0233962 | A1* | 9/2012 | Bennett | A01F 15/0715 53/203 |
| 2012/0240516 | A1* | 9/2012 | Chapon | A01F 15/0715 53/203 |
| 2014/0352263 | A1 | 12/2014 | Harchol et al. | |
| 2016/0280404 | A1 | 9/2016 | Porter et al. | |

FOREIGN PATENT DOCUMENTS

| | | |
|---|---|---|
| DE | 102004023701 A1 | 12/2005 |
| WO | 2010112373 A1 | 10/2010 |

OTHER PUBLICATIONS

European Search Report issued in counterpart application No. 18170536.9 dated Nov. 28, 2018. (7 pages).

* cited by examiner

ENVELOPING DEVICE FOR ENVELOPING A BALE WITH AN ENVELOPING MATERIAL, A BALER, AND METHOD THEREOF

RELATED APPLICATIONS

This application claims priority to German Patent Application Ser. No. 102017210849.5, filed Jun. 27, 2017, the disclosure of which is hereby incorporated by reference in its entirety.

FIELD OF THE DISCLOSURE

The present disclosure relates to an enveloping device for enveloping a bale with an enveloping material for a baler, and in particular to an enveloping device having a braking device for the enveloping material.

BACKGROUND

Conventional enveloping devices are used on balers in order to wrap a round bale formed in a pressing chamber of the baler with an enveloping material such as, for example, a net, a film or a similar optionally semipermeable, breathable or water-repellent material. This is often done before the bale is discharged from the baler after enveloping is complete and then laid on the ground or is transferred to a further device, for example, a wrapping device.

Balers of this kind are used both in the agricultural and the industrial sectors. Corresponding agricultural balers serve, for example, to form bales of harvested material and produce frequently at least substantially round cylindrical bales from harvested material, for example, of the straw, hay, chopped material etc. Industrial balers are used in the compaction of waste, textiles or other materials, and in the pressing thereof to form bales.

DE-10026066-A1 shows an apparatus for enveloping a round bale with enveloping material. The apparatus has a brake, disposable against the surface of the enveloping material, with a contact element and an adjusting apparatus, wherein the brake is disposable against the enveloping material by means of a motor. A control device is provided which makes it possible to evaluate signals from sensors concerning the taken-off quantity of net or film, the take-off speed and the like, and then to define the press-on time and the press-on force. The brake is intended to tension the enveloping material during winding and to prevent any running on of the enveloping material. After the enveloping material has been detached, a free end of the enveloping material hangs down over a directing means, making it difficult for the enveloping means to be grasped by the bale or for a bale to be enveloped with an at least substantially defined quantity of enveloping material.

SUMMARY

In one embodiment of the present disclosure, an enveloping device for enveloping a bale with an enveloping material in a pressing chamber of a baler has a braking device for the enveloping material. The braking device is configured such that it has the effect that the enveloping material assumes an at least substantially predetermined position, with respect to the pressing chamber, to at least one working means of the baler or to the bale such as at the end or start of an enveloping operation. The baler is an agricultural baler for forming round cylindrical bales. The baler can also be used in the industrial sector, however, in order to form bales of paper, waste, fabric or other materials. It is furthermore conceivable for it to be a baler for producing square bales, as are used both in the agricultural and the industrial sectors. An enveloping device of this kind can be used with any known enveloping material, for example, a film or a net. However, the use thereof is particularly advantageous when an enveloping material is used which is subdivided, with regard to its longitudinal extent, into substantially automatically separable portions, since in this case, exact positioning of the enveloping material, in particular at the start of an enveloping operation, contributes toward the bale being enveloped with a particular quantity of enveloping material such as exactly one portion.

If a braking means is provided, it can interact directly or indirectly with the enveloping material.

The braking means may be intended to be disposable selectively against the enveloping material, for example in that it is configured in the manner of a brake block that is disposable against the enveloping material and liftable off the latter. However, it is configured in the manner of a roller or roll, in particular with a coated (i.e., rubber-coated) or profiled surface. The braking means can, however, also engage with or contact the enveloping material in order to brake it. To this end, it is configured in the manner of a lever device which interacts appropriately with the enveloping material. For example, it engages in a cutout provided in a peripheral region in order to brake the enveloping material or to determine the position thereof.

If a drive for delivering the enveloping material is provided, it can selectively prevent or interrupt delivery of the enveloping material. The drive can set a supply roll, on which the enveloping material is wound, in rotation. To this end, the drive can directly drive the supply roll or act indirectly on the supply roll by acting on the supply roll or the enveloping material from the outside. Thus, provision can be made for the drive to drive, for example, a roller or roll, which in turn acts on the supply roll in order to be able to set the latter in rotation. The roll or roller can also be provided, however, in order to draw enveloping material off a supply roll.

However, it is also conceivable for the drive to drive a feed roll which, together with further pressing means, determines the pressing chamber of the baler. The drive can also be configured in the form of an electric stepping motor. It is also conceivable, however, for the braking means to engage in the drive, to act on the latter or to brake the latter, by acting on a belt or a drive pulley of a belt drive.

If the braking device is configured such that it can interact with at least one marking provided on the enveloping material, this can contribute toward determining the position of the enveloping material.

If at least one sensor is provided, it can interact with a control device such as, for example, a control device of the baler in order to control the enveloping device or the braking means. The sensor is suitable for detecting a marking, in particular a marking of the cutout, protrusion or difference in color, or texture type. The sensor may be any suitable sensor, including an optical sensor, but also a tactile sensor. However, braking devices are also conceivable which do not interact with a control device or require no control by a control device.

It is possible to equip a baler, i.e., an agricultural baler for forming round cylindrical bales, with such an enveloping device. The baler can be operated both with conventional enveloping materials, for example, of the net or film type, which need to be separated or cut off at the end of an enveloping phase of the bale and used with enveloping materials which do not need to be detached or cut off since they have a predetermined tearing region or a predetermined tearing location. In particular, in the case of an enveloping material having a predetermined tearing region, it may be desirable for a starting region or a free end of the enveloping material to be positioned in a defined manner at the start of an enveloping operation so as to ensure that the bale is enveloped with a portion of at least substantially determined length. The baler may be an agricultural baler for forming round cylindrical bales. However, the baler can also be used in the industrial sector, for example, in order to form bales of paper, waste, fabric or other materials. Moreover, it is possible for it to be a baler for producing square bales, as are used both in the agricultural and the industrial sectors.

In a method for enveloping a bale with an enveloping material by means of an enveloping device for a baler, i.e., for forming round cylindrical bales in a pressing chamber of the baler, a braking device of the enveloping device acts on the enveloping material or interacts therewith such that the enveloping material assumes an at least substantially predetermined position with respect to the pressing chamber to at least one working means of the baler or to the bale at the end or start of an enveloping operation. The method can be used with any known enveloping material, for example, a film or a net. However, the use thereof is particularly advantageous when an enveloping material is used which is subdivided, with regard to its longitudinal extent, into substantially automatically separable portions. In this case, exact positioning of the enveloping material at the start of an enveloping operation contributes toward the bale being able to be enveloped with a particular quantity of enveloping material, i.e., exactly one portion.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
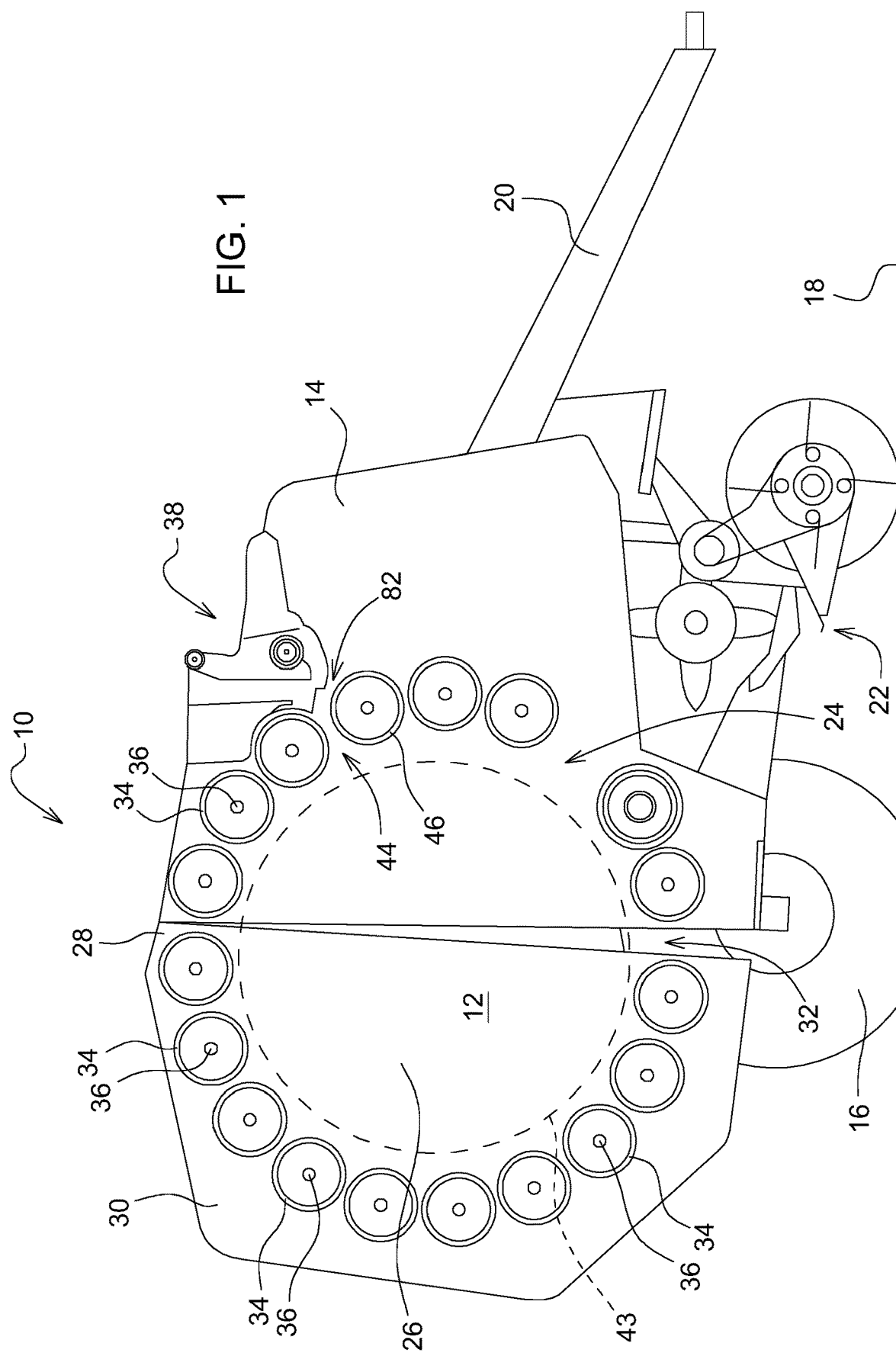
FIG. 1 is a schematic side view of an agricultural baler with pressing means and an enveloping device.
Figure 2:
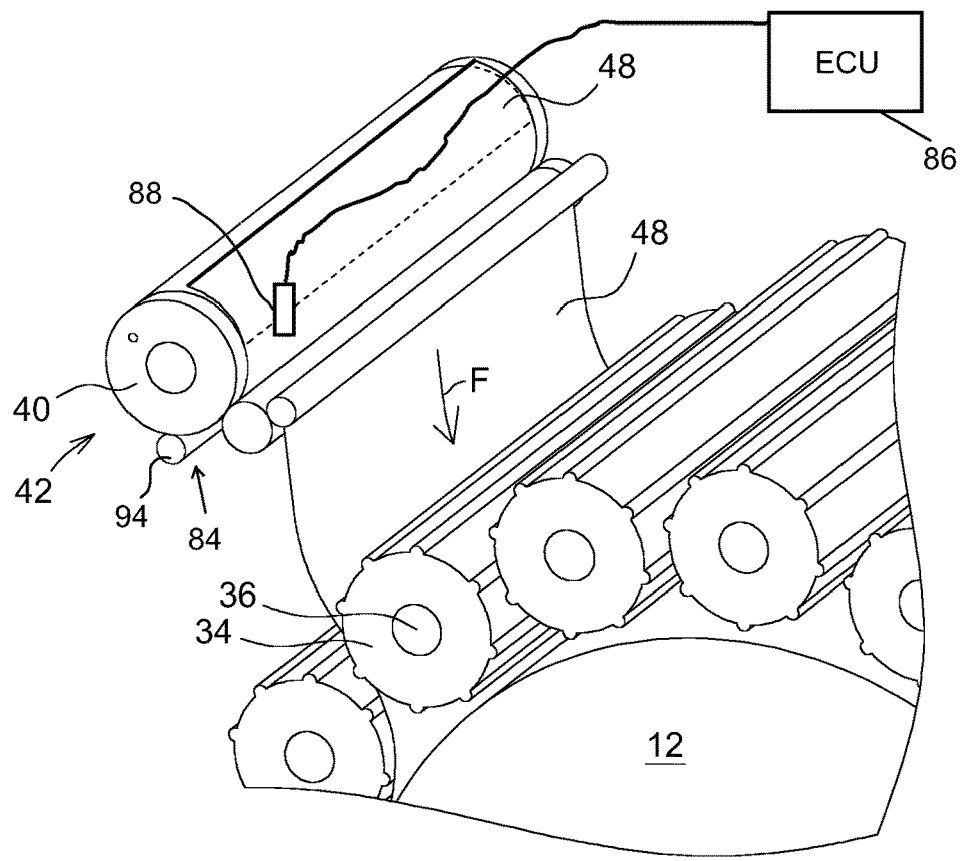
FIG. 2 is an enlarged illustration of the enveloping device with an enveloping material wound on a supply roll, during the enveloping of a bale with enveloping material.

FIG. 1 of the drawing shows a schematically illustrated baler 10, of the agricultural baler type for pressing a round cylindrical bale 12, the baler having a first housing part 14 which is supported on the ground 18 by means of wheels 16 and which is attachable to a towing vehicle (not shown), for example, a tractor, by a drawbar 20.

Located in a known manner on a front, with regard to a direction of forward travel, lower side of the first housing part 14 is a receiving apparatus 22 for receiving and feeding harvested material. The receiving apparatus 22 delivers cut harvested material into a pressing chamber 26 through a feed duct 24, wherein the first housing part 14 surrounds a front part of the pressing chamber 26. Located in the rear upper corner region of the first housing part 14 is a bearing 28 for a pivotable second housing part 30, which surrounds a rear part of the pressing chamber 26. In the opened state, the second housing part 30 opens up an opening 32 through which a bale 12 pressed by the baler 10 can be deposited, unloaded or ejected. The pivotable second housing part 30 can be actuated (opened and closed) by means of actuators (not shown) and thus represents an outlet flap for a bale 12 pressed in the pressing chamber 26.

According to this embodiment, the pressing chamber 26 of the baler 10 is configured with an invariable size and the baler 10 has a multiplicity of pressing rollers 34 that extend parallel to one another (by way of example, only a few pressing rollers 34 are shown), the axes of rotation 36 of which lie on a circular arc with the second housing part 24 closed, and at least some of which are driven. In addition to pressing and shaping, the pressing rollers 34 also serve to set or keep the round bale 12 arranged in the pressing chamber 20 in rotation. The baler 10 is depicted with a slightly open rear housing part 30 here by way of example to illustrate the opening 32. During a pressing operation, said rear housing part 30 is closed, however.

Furthermore, the baler 10 comprises an enveloping device 38, which is equipped with a supply roll 40 for enveloping material 42, the supply roll 40 feeding the enveloping material 42 to the pressing chamber 26 through a feed gap 44. Provided directly beneath the feed gap 44, or adjoining the latter, is a feed roll 46 which, apart from its position, is identical to the other pressing rollers 34 and can be driven in rotation therewith via a drive (not shown).

Following completion of the actual baling operation, i.e., the reception of harvested material and the formation of a bale 12 by the pressing rollers 34, travel over the ground 18 is interrupted since the baler 10 is filled with the bale 12 and no further harvested material should or can be received in the pressing chamber 26. At this time, the enveloping device 38 is also activated, an enveloping operation following the baling operation is initiated and the enveloping material 42 is guided from the supply roll 40 through the feed gap 44 into the pressing chamber 26 and onto the bale 12. By sustained rotation of the bale 12 located in the pressing chamber 26, the enveloping material 42 is wrapped around the bale 12 such that it envelops a lateral surface 43 of the bale 12. Once the enveloping operation has been concluded, the bale 12 is deposited on the ground 18 through the opening 32 via an unloading ramp (not shown) by means of the second housing part 30 that acts in the manner of an outlet flap being opened. The baler 10 then resumes traveling and a new baling operation starts.

Referring to FIGS. 2 to 5, the enveloping device 38 and the enveloping material 42 are shown in an enlarged illustration. The enveloping device 38 is configured basically in a known manner according to the present embodiment. The enveloping material 42 is fed to the feed gap 44 in this case such that it is grasped by the driven feed roll 46 and delivered in the direction of the bale 12. The enveloping material 42 is guided at least substantially from above onto the feed roll 46, with the result that it can be grasped and entrained thereby easily (see FIG. 2).

Figure 3:
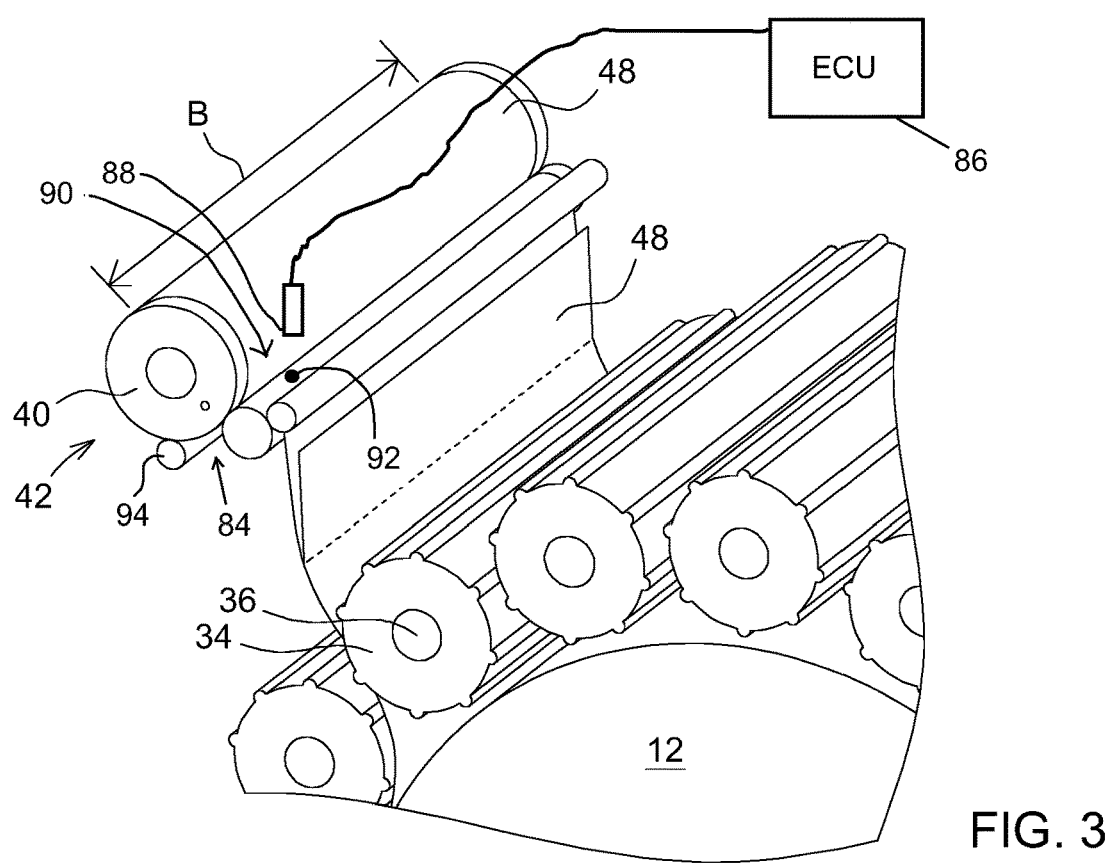
FIG. 3 is an illustration as per FIG. 2 toward the end of the enveloping operation, wherein the bale is already completely wrapped with enveloping material.
Figure 4:
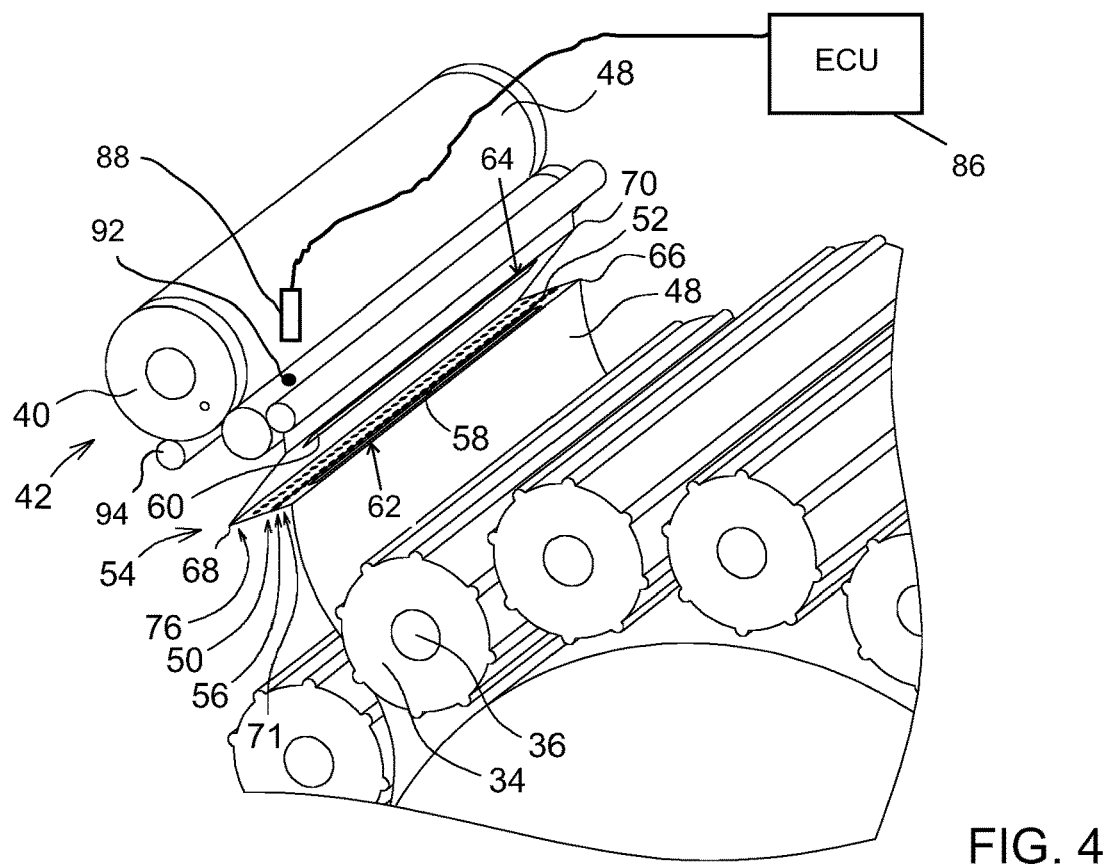
FIG. 4 is an illustration as per FIGS. 2 and 3, wherein a folding region of the enveloping material is starting to unfold.
Figure 5:
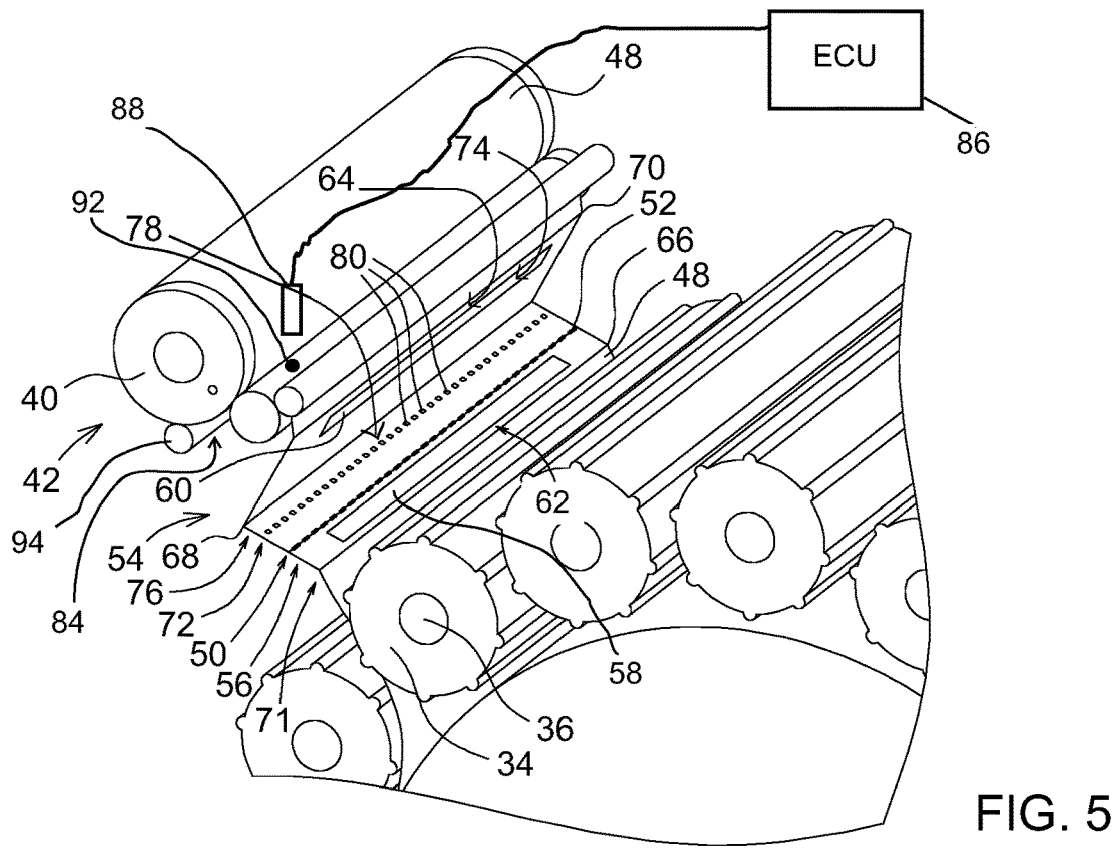
FIG. 5 is an illustration as per FIG. 4 with an almost completely unfolded folding region.
Figure 6:
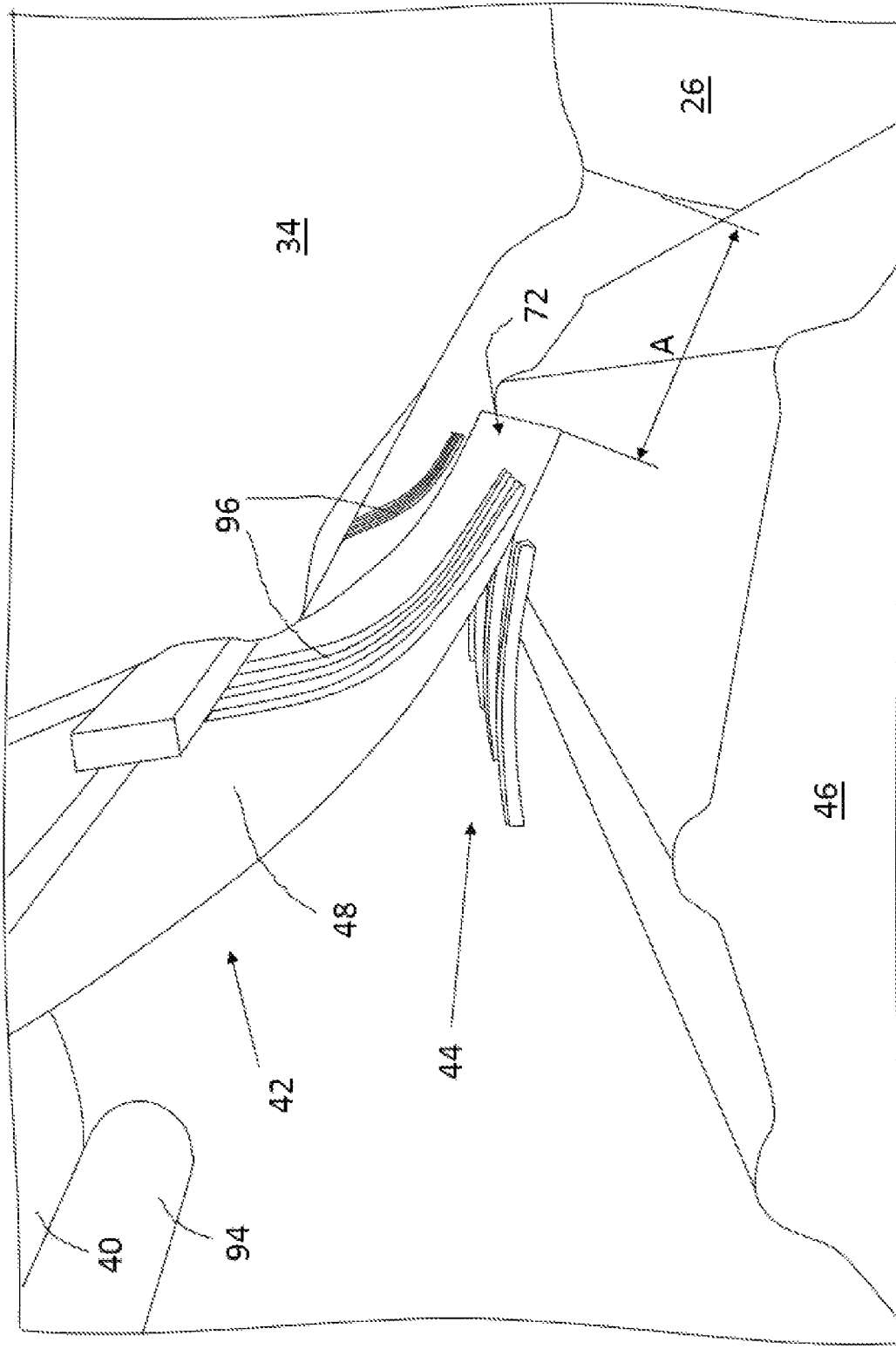
FIG. 6 is an illustration of a starting region, arranged in a feed gap, of the enveloping material.

FIGS. 3-5 show the enveloping device 38 and the enveloping material 42 now in successive phases of an enveloping operation. According to FIG. 3, the bale 12 is now almost completely enveloped with enveloping material 42 and the enveloping operation is nearly complete. Looking at the supply roll 40, it is clear that the enveloping material 42 is subdivided into portions 48 in the longitudinal direction such that in each case one portion 48 is used for enveloping a bale 12, wherein predetermined tearing regions 50 are provided between the portions 48. According to the present embodiment, these predetermined tearing regions 50 are embodied in the manner of perforation lines 52 that extend across the width B of the enveloping material 42.

Furthermore, the enveloping material 42 has folding regions 54 and adhesive regions 56, wherein the adhesive regions 56 each have two adhesive components 58, 60 configured in the manner of adhesive strips. These adhesive components 58, 60 are in turn attached to the enveloping material 42 by means of further adhesive components 62, 64 that are shown only by way of indication.

The folding regions 54 each have a first, a second and a third folding edge 66, 68, 70, which are provided one after another with respect to the delivery direction F. The first folding edge 66 is provided in an end region 71 of a portion 48 running ahead, the second folding edges 68, 70 are provided in a portion 48 running behind, wherein the adhesive region 56 and the predetermined tearing region 50 are provided between the first folding edge 66 and the second folding edge 68 and the adhesive region 56 runs ahead of the predetermined tearing region 50. The first folding edge 66 and the second folding edge 68 furthermore define a first lateral region 72 between one another and the second folding edge 68 and the third folding edge 70 define a second lateral region 74 between one another.

If the enveloping material 42 is wound on the supply roll 40, the folding regions 52 are folded together such that the predetermined tearing region 50 and the adhesive region 56 are arranged between the lateral regions 72, 74, specifically such that the adhesive components 58, 60 come to rest on one another. The second adhesive component 60 is in the form of a silicone-type material which adheres only lightly to the first adhesive component 58 in the folded state of the folding region 54 such that the folding region 54 is held together by the first and second adhesive components 58, 60 in a state wound on the supply roll 40.

If the bale 12 has been completely wrapped with enveloping material 42, as is illustrated in FIGS. 4 and 5, the rotating bale 12 acts on the enveloping material 42 such that it exerts a force acting in the delivery direction F thereon. Here, the force exceeds an adhesive force between the first and second adhesive components 58, 60 and unfolding the folding region 54. The first adhesive component 58 now passes into abutment with the enveloping material 42 enveloping the bale 12 and forms a firmly adhesive connection therewith.

The force applied by the rotating bale 12 now acts on the predetermined tearing region 50 and separates the portions 48 from one another along the perforation line 52. The bale 12 is now enveloped with enveloping material 42 and can be discharged from the pressing chamber 26.

The enveloping material 42 furthermore has, in a starting region 76 of each portion running behind, a row of entrainers 78 in the form of substantially round cutouts 80. The entrainers 78 extend transversely across the width B of the enveloping material 42 and adjoin, at a distance, the predetermined tearing region 50 that runs ahead with respect to the delivery direction F, and are provided in front of the second folding edge 68, or between the predetermined tearing region 50 running ahead and the second folding edge 68.

By way of the entrainers 78, the enveloping material 42, or a starting region 72 of each portion, can be grasped for example by the bale 12 or by material forming the bale 12 by stalks of harvested material of the straw or hay type.

Furthermore, the row of cutouts 80 can also serve as a safety device in the event that no separation takes place along the predetermined tearing region 50 or the portion 48 enveloping the bale 12 is too short. Alternatively, separation can now take place along the cutouts 80 arranged in a row and thus wrapping of the bale 12 with a second portion 48 can be prevented.

If the enveloping device 38 has a feed device 82 (shown by way of indication in FIG. 1) for the enveloping material 42, a feed lever is provided in a pivotable manner on the enveloping device 38. The feed lever can interact with the entrainer 78, or engage in the or one of the cutout(s) 80 in order to guide the enveloping material 42 onto the feed roll 46 or the bale 12. Interaction of the feed device 82 with the entrainer 78 and, in particular engagement in the or one of the cutout(s) 80, can further determine the position of the enveloping material 42 or of that portion 48 of the enveloping material 42 that is grasped by the feed lever with respect to the feed device 82 and thus the enveloping device 38 or the bale 12. This can contribute toward the enveloping material 42 or the portion 48 for enveloping the bale 12 being positioned such that the length of the portion 48 that follows onto the feed device is at least substantially the same for each enveloping operation.

It should be noted here that the entrainers 78 can also be provided on conventional or known enveloping materials, or on enveloping materials that differ from the above-described enveloping material, e.g., films, or an above-described enveloping material 42 does not necessarily have to be provided with such entrainers 78.

Reference is now made in particular to FIGS. 2-6, in which a braking device 84 for an enveloping material 42 is shown. The braking device 84 can be used on an above-described enveloping device, a conventional enveloping device, a baler, or in conjunction with an above-described and a conventional enveloping material such as a net or a film.

According to the present embodiment, the braking device 84 is operatively connected to a control device 86 of the baler 10 and has a sensor 88, of the optical sensor 88 type, which can detect whether a marking 92 provided in a peripheral region 90 of the enveloping material 42 is located in a sensing region of the sensor 88.

If the sensor 88 identifies that a marking 92 is present in its sensing region, it transmits this information to the control device 86, which accordingly activates the braking device 84 such that a braking means 94 of the braking device 84 is applied to the enveloping material 42 in order to brake the latter. The marking 92 is arranged on the enveloping material 42 such that it indicates to the braking device 84 that it should brake the enveloping material 42 when the starting region 72 of a portion 48 running behind a portion 48 enveloping a bale 10, or the end thereof that is now free following severing of the portion 48 enveloping the bale 10 along the predetermined tearing region 50, takes up a predetermined position (see FIG. 6). In particular, the portion 48 is braked such that its starting region 72, or its free end, is arranged in the feed gap 44 such that a distance A between the starting region 72 and the pressing chamber 26 is at least substantially the same at the start of each enveloping operation. According to the illustration in FIG. 6, the enveloping material 42, or the starting region 72, is held in abutment with the feed roll 44 by a directing means 96 which is not required for the desired action of the braking device.

In this way, the braking device 84 contributes toward each bale 10 being enveloped with an at least substantially identical quantity of enveloping material 42. Alternatively, this is applicable in the case of an aforementioned enveloping material 42 subdivided into portions 48, or an enveloping material 42 having predetermined tearing regions 50 being enveloped with exactly one portion 48, or each portion 48 being positioned appropriately for enveloping a bale.

Alternatively, a braking device 84 can also be controlled in a temporally cyclical manner. However, it is also conceivable for sensor means 88 to be provided which determines the length of the enveloping material 42 already drawn from the supply roll 40. The braking device 84 can also have a lever device (not shown), however, which interacts with a marking 92 of the cutout type, into which a mechanical braking element in the form of a lever element provided in an articulated manner on the enveloping device 38 can engage in order to brake the enveloping material 42. After the enveloping material 42 has been separated, the braking element can pivot or be pivoted back into a starting position in which it does not act on the enveloping material 42. The braking device 84 does not necessarily have to be controlled by a control device. Provision can also be made for a drive (not shown), for example, a drive of the supply roll 40, to be braked or deactivated in a corresponding manner, however.

The separation of the portions 48 along the predetermined tearing region 50 can take place without the aid of further auxiliaries, in particular without the use of a separating device or cutter arrangement. Furthermore, or alternatively, a force acting on the predetermined tearing region 50 can be increased or an additional force can be applied by the braking device 84 shown at the end of an enveloping operation, however.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An enveloping device for a baler, the enveloping device comprising:
   a supply of an enveloping material subdivided into a plurality of portions in a longitudinal direction of the supply, with each of the plurality of portions having a marking, wherein the supply is configured to feed the enveloping material into a pressing chamber of the baler through a feed gap;
   an optical sensor for detecting the markings of the plurality of portions of the enveloping material;
   a braking device operable to apply a braking means to the supply of the enveloping material; and
   a control device in communication with the optical sensor for receiving information from the optical sensor when the optical sensor detects one of the markings, wherein the control device is configured to activate the braking device in response to receiving the information from the optical sensor, such that the braking means of the braking device is applied to the supply of the enveloping material in response to the optical sensor detecting one of the markings so that the enveloping material assumes a predetermined position with respect to the pressing chamber.

2. The enveloping device of claim 1, wherein the braking means is selectively disposable against the enveloping material.

3. The enveloping device of claim 1, wherein the braking means selectively engages with or contacts the enveloping material.

4. The enveloping device of claim 3, wherein the braking means comprises a roller or roll.

5. The enveloping device of claim 3, wherein the braking means comprises a lever device.

6. The enveloping device of claim 1, further comprising a drive for delivering the enveloping material into the baling chamber, the drive selectively preventing delivery of the enveloping material or interaction with the braking means.

7. A baler for forming a bale, the baler comprising:
   a housing;
   a plurality of wheels for supporting the housing;
   a receiving apparatus for receiving harvested material;
   a pressing chamber for receiving the harvested material from the receiving apparatus; and
   an enveloping device including a supply of enveloping material subdivided into a plurality of portions in a longitudinal direction of the supply with each of the plurality of portions having a marking, and a braking device operable to apply a braking means to the supply of the enveloping material;
   wherein, the supply is configured to feed the enveloping material to the pressing chamber of the baler through a feed gap;
   an optical sensor for detecting the markings of the plurality of portions of the enveloping material; and
   a control device in communication with the optical sensor for receiving information from the optical sensor when the optical sensor detects one of the markings, wherein the control device is configured to activate the braking device in response to receiving the information from the optical sensor, such that the braking means of the braking device is applied to the supply of the enveloping material in response to the optical sensor detecting one of the markings so that the enveloping material assumes a predetermined position with respect to the pressing chamber.

8. The baler of claim 7, wherein the braking means is selectively disposable against the enveloping material.

9. The baler of claim 7, wherein the braking means selectively engages with or contacts the enveloping material.

10. The baler of claim 9, wherein the braking means comprises a roller or roll.

11. The baler of claim 9, wherein the braking means comprises a lever device.

12. The baler of claim 7, further comprising a drive for delivering the enveloping material into the baling chamber, the drive selectively preventing delivery of the enveloping material or interaction with the braking means.

13. A method for enveloping a bale formed in a baler with an enveloping material, the method comprising:
  providing an enveloping device having a supply of enveloping material subdivided into a plurality of portions in a longitudinal direction of the supply with each of the plurality of portions having a marking, and a braking device operable to apply a braking means to the supply of the enveloping material;
  forming the bale in a pressing chamber of the baler;
  triggering an enveloping operation to wrap the bale with the enveloping material;
  sensing one of the markings with an optical sensor;
  communicating information related to the marking sensed by the optical sensor to a control device;
  activating the braking device with the control device in response to the control device receiving the information from the optical sensor relating to the marking sensed by the optical sensor, such that the braking means of the braking device is applied to the supply of the enveloping material so that the enveloping material assumes a predetermined position with respect to the pressing chamber.

* * * * *